United States Patent Office 3,312,885
Patented Apr. 4, 1967

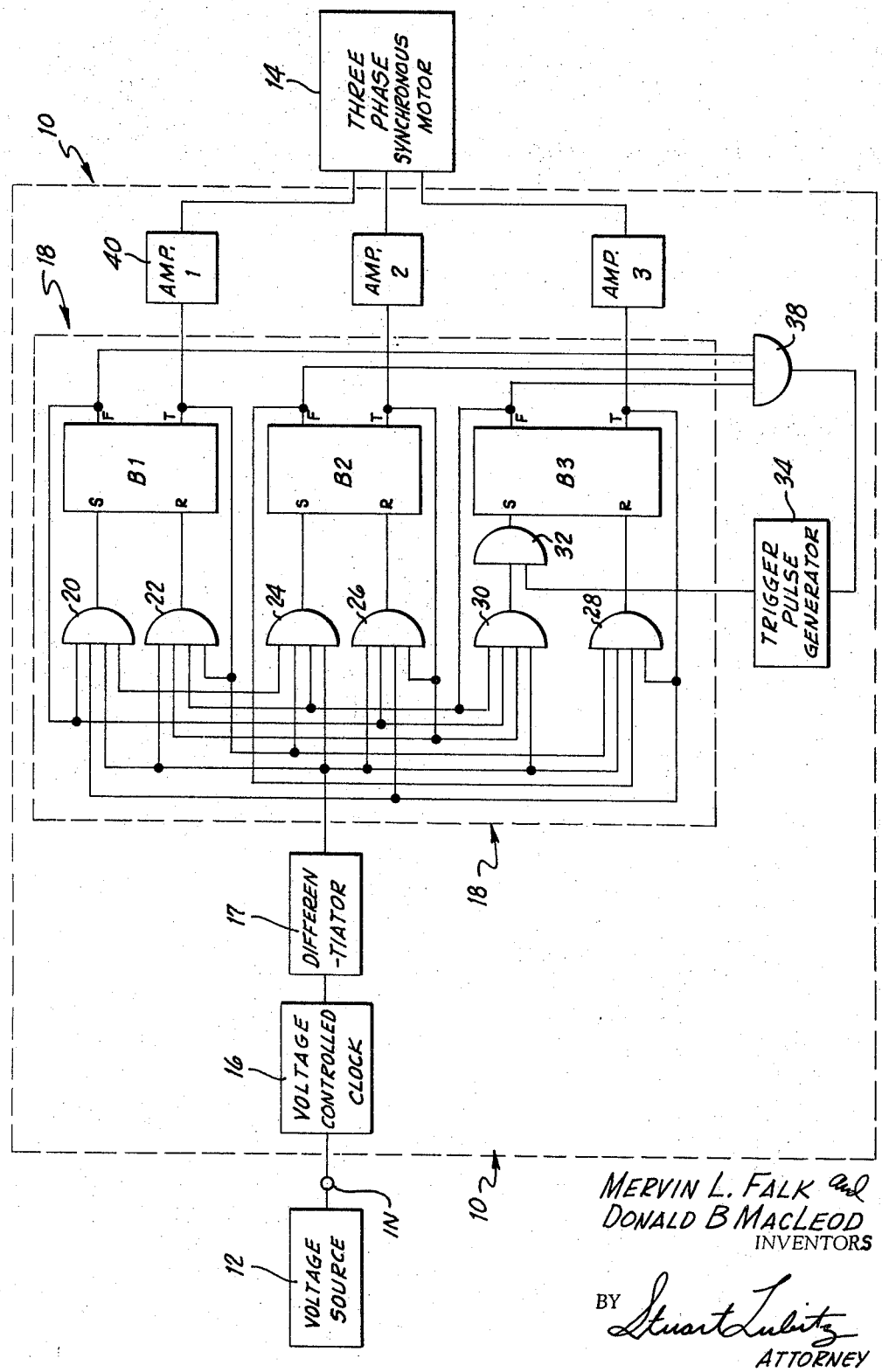

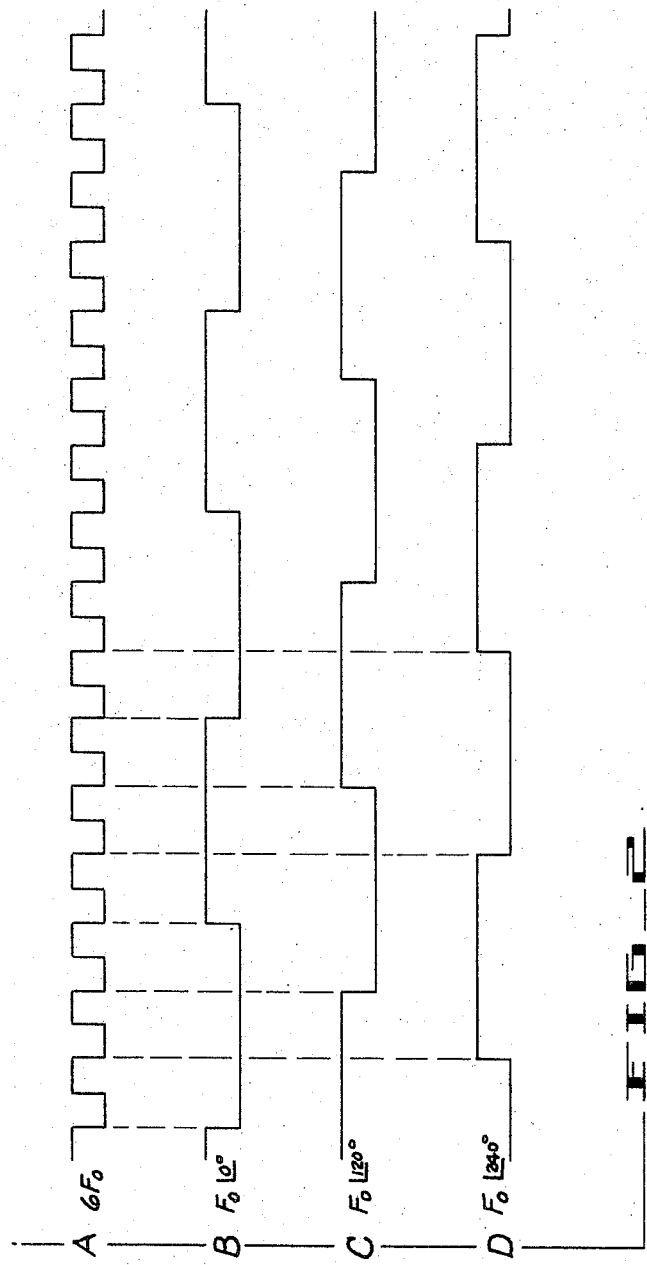

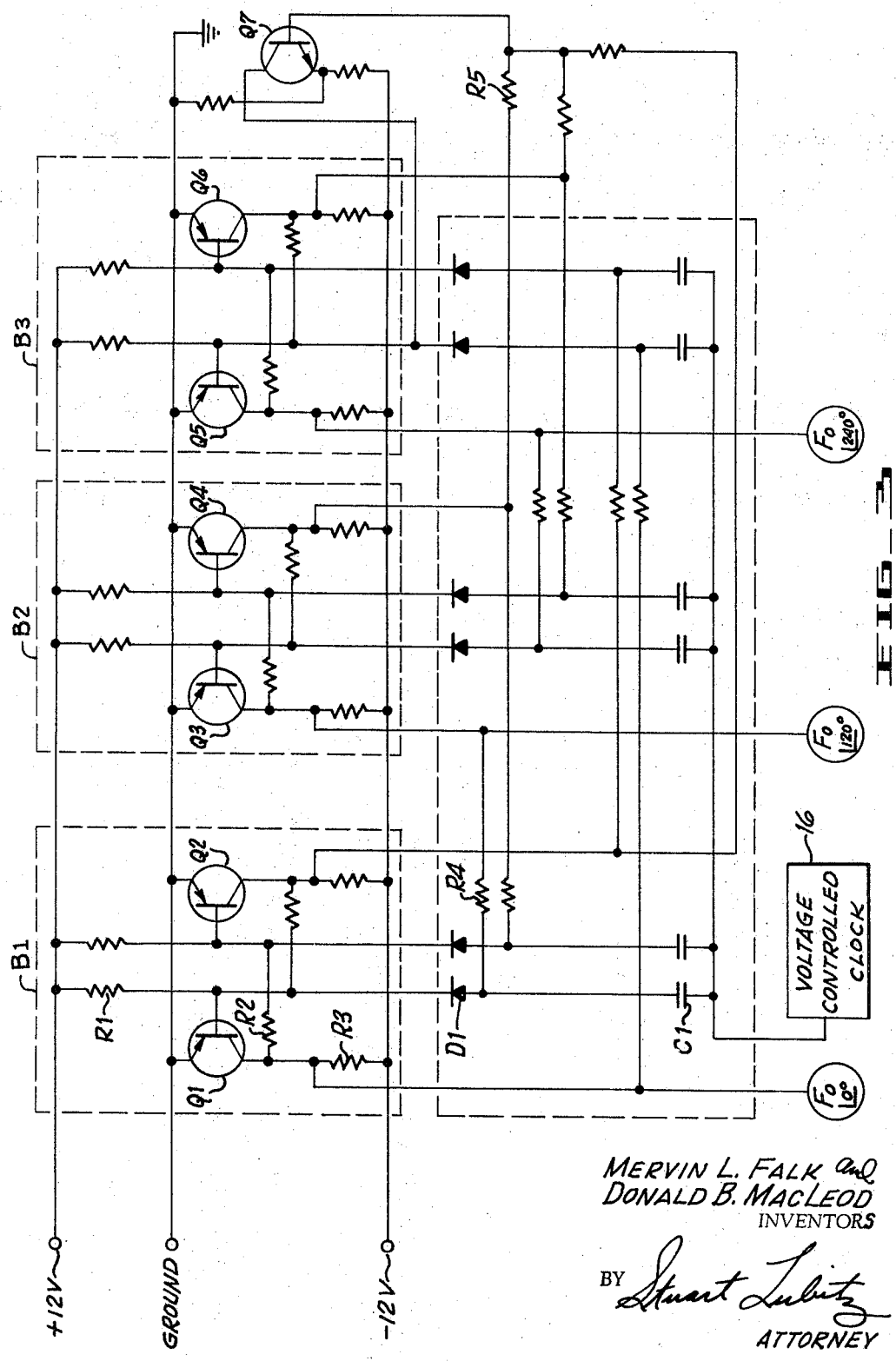

3,312,885
MOTOR DRIVE APPARATUS
Melvin L. Falk, Sunnyvale, and Donald B. Mac Leod, Redwood City, Calif., assignors to Ampex Corporation, Redwood City, Calif., a corporation of California
Filed Jan. 16, 1964, Ser. No. 338,249
7 Claims. (Cl. 318—171)

This invention relates generally to motor drive apparatus and more particularly to a three phase voltage supply means suitable for driving a synchronous motor.

As is well known in the art, synchronous motors are employed in many different applications which require its constant speed characteristic. In one interesting application of the synchronous motor, it is employed to move scanning heads over a moving magnetic tape in video recorders such as the one described in U.S. Patent 3,017,462. In this application the speed of the tape must be precisely related to the speed of the motor. Consequently it is conventional practice in this and other similar applications to develop an analog voltage representing time base error of the reproduced information and to apply the analog voltage to a voltage controlled oscillator. The output of the oscillator is then split into three voltages displaced by 120°. The development of the three phase voltages is conventionally accomplished by the use of frequency sensitive networks and linear amplifiers. The use of such networks is unsatisfactory because of their poor transient response due to inherent amplitude and phase nonlinearities with respect to frequency. In addition, attempts have been made to improve prior art devices by reducing their complexity, size, weight, and power consumption and increasing their reliability.

In view of the foregoing, it is an object of the present invention to provide apparatus for driving a synchronous motor which as compared to known apparatus has a superior transient response characteristic, is less complex, smaller, lighter, requires less power, and is more reliable.

A further disadvantageous feature of conventional three phase motor drive apparatus is that its frequency response is rather limited. Consequently, it is an object of this invention to provide a three phase motor drive apparatus which has an extremely wide frequency response.

More broadly, it is an object of the present invention to provide improved apparatus for developing, from a single phase signal, N phase voltages displaced from one another by 360°/N.

For precision rotational phase control of a synchronous three phase motor, an essentially pure sine wave of current through each of the motor's windings is required. If the motor forms part of a closed loop servo system, it is furthermore desirable that the phase voltages not be band limited and that the sidebands (developed due to error signal phase modulation) undergo no non-linear delay distortion. The invention herein is directed to apparatus for providing current suitable for driving a synchronous motor and is based on the not heretofore recognized concept that essentially pure sine wave fundamental phase currents can be caused to flow in the motor windings by applying square wave three phase voltages thereto.

In a preferred embodiment of the invention, three square wave phase voltages are developed from the output of a voltage controlled oscillator by applying the oscillator output to three bistable devices, e.g. conventional flip-flop circuits. The output signals provided by the three bistable devices, as a result of their being initiated by a single source, are symmetric and displaced from one another by an accurate 120°.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a preferred embodiment of apparatus constructed in accordance with the present invention;

FIGURE 2 is a waveform diagram illustrating a square wave oscillator output signal and three phase voltages developed therefrom; and FIGURE 3 is a schematic diagram of the counter apparatus illustrated in block form in FIGURE 1.

Attention is now called to FIGURE 1 of the drawing which illustrates the apparatus 10 in accordance with the present invention for coupling a control signal provided by a voltage source 12 to the windings of a three phase synchronous motor 14. As pointed out in the introduction to the specification, in many applications it is desirable to control the speed of a three phase synchronous motor in accordance with the level of an analog voltage signal, which may for example be representative of the time base error signal of the reproduced information. The synchronous motor 14 is of conventional construction and will operate at a constant speed which is proportional to the frequency of the signal applied thereto.

The apparatus 10 is provided in order to convert the analog voltage signal level to three phase voltages displaced from one another by 120° and each having the same frequency which is proportional to the level of the analog voltage signal.

The output of the source of the analog voltage signal 12 is connected to the input terminal of apparatus 10. The input terminal of apparatus 10 is in turn connected to the input of a voltage controlled oscillator or clock 16. The oscillator 16 can be of substantially conventional construction and for the purpose of the invention herein, need merely have a characteristic which causes it to provide a stream of pulses or non-sinusoidal oscillatory output signal whose frequency is proportional to the amplitude of the voltage applied to the oscillator. The output signal provided by the oscillator 16 will be assumed to have a frequency equal to $6F_0$, the output signal being illustrated in FIGURE 2(a). The output of the oscillator 16 is connected through a differentiator circuit or filter circuit 17 to the input of a counter 18. The differentiator circuit 17 will provide a clock pulse in response to the trailing edge of each positive half cycle of the oscillator output signal. Preferably, the counter 18 should be a scale of 2 N counter where N represents the number of phases of the multiphase synchronous motor to be controlled. Herein, it is assumed that a three phase synchronous motor is employed and consequently, the counter 18 is preferably a scale of six type counter.

Counter 18 includes three bistable devices which may be conventional set-reset flip-flop circuits, B1, B2 and B3, each such circuit having set and reset input terminals and true and false output terminals. And gates 20 and 22 are respectively connected to the set and reset input terminals of bistable device B1. And gates 24 and 26 are respectively connected to the set and reset input terminals of bistable device B2. And gate 28 is connected to the reset input terminal of bistable device B3, and And gate 30 is connected through Or gate 32 to the set input terminal thereof. The output of differentiator circuit 17 is connected to the input of each of And gates 20, 22, 24, 26, 28, 30. The following logical equations define the additional inputs to each of the And gates connected to the set and reset input terminals of the bistable devices:

$$_sB3 = \overline{B1}\ B2\ \overline{B3}$$
$$_RB3 = B1\ \overline{B2}\ B3$$
$$_sB2 = B1\ \overline{B2}\ \overline{B3}$$
$$_RB2 = \overline{B1}\ B2\ B3$$
$$_sB1 = \overline{B1}\ \overline{B2}\ B3$$
$$_RB1 = B1\ B2\ \overline{B3}$$

As a consequence of interconnecting the bistable devices of counter 18 according to the logical equations, the following truth table defines the successive counter states:

| $t_0$ | | | $t_1$ | | |
|---|---|---|---|---|---|
| B1 | B2 | B3 | B1 | B2 | B3 |
| 0 | 1 | 0 | 0 | 1 | 1 |
| 0 | 1 | 1 | 0 | 0 | 1 |
| 0 | 0 | 1 | 1 | 0 | 1 |
| 1 | 0 | 1 | 1 | 0 | 0 |
| 1 | 0 | 0 | 1 | 1 | 0 |
| 1 | 1 | 0 | 0 | 1 | 0 |

From the truth table, it should be noted that an all false or an all true state is prohibited. In order to assure that either of these do not occur when power is initially applied to the system, a second input to Or gate 32 is derived from the output of trigger pulse generator 34 whose input is connected to the output of And gate 38. The false output terminals of bistable devices B1, B2, B3 are all connected to the inputs of And gate 38. As a result, if all of the bistable devices were ever false, And gate 38 would be enabled to cause trigger pulse generator 34 to set device B3 through Or gate 32.

FIGURE 2 illustrates the output signal waveforms provided by the devices of counter 18. It should be noted that the frequency of the output signal provided by device B1 is equal to $F_0$, i.e. one-sixth the frequency of the oscillator output signal. Likewise, the output signals provided by devices B2 and B3 will also have a frequency $F_0$. However, as can be noted from FIGURES 2(c) and 2(d), the output signals provided by devices B2 and B3 will be displaced from the output signal provided by device B1 by 120° and 240° respectively. The precise phase relationship between the output signals provided by the bistable devices is assured as a consequence of the device transitions being initiated by a single source. Moreover, the symmetry of the output waveform provided by the bistable devices is likewise assured.

The true output terminals of each of the bistable devices B1, B2, and B3 are connected to the input terminals of amplifiers 40. Each amplifier can be a nonlinear (switching) device which functions to switch the motor winding coupled thereto between a direct current potential and ground. That is, whenever the output signal provided by a bistable device is at a positive level, the amplifier will couple the corresponding motor winding to a direct current supply potential. On the other hand, whenever the bistable device switches to a second state so that its output is at, e.g. ground potential, then the corresponding motor winding is grounded.

Thus, the apparatus 10 of FIGURE 1 functions to provide three square wave phase voltages to the windings of synchronous motor 14. Although an essentially pure sine wave of current through each of the motor's windings is necessary if precision rotational control of a motor of the type contemplated is to be achieved, the application of the square wave phase voltages to the motor windings will in fact result in the propagation of essentially pure sine wave currents of a fundamental frequency in the windings. Almost perfect elimination of all of the harmonics can be expected for various reasons. E.g. all of the even harmonics are eliminated due to the perfect symmetry of the square wave signals applied to the motor windings. The third harmonic voltage components are applied in phase due to the precise 120° phase displacement between the signals applied to the windings. The effect of the fifth and higher harmonics on the motor torque are negligible due to (1) the relatively small voltage amplitude of higher order harmonics, it being recalled that even order harmonics are completely absent; (2) high motor winding impedance at these higher frequencies; and (3) the inability of the motor's rotational mass to respond to these higher order frequencies.

Attention is now called to FIGURE 3 which schematically illustrates one circuit arrangement of the counter 18 of FIGURE 1. Each bistable device of the counter 18 is identical and includes a pair of PNP transistors. Thus device B1 includes transistors Q1 and Q2, device B2 includes transistors Q3 and Q4 and device B3 includes transistors Q5 and Q6. The base of each of transistors Q1 and Q2 is connected through a resistor R1 to a source of positive potential, nominally +12 volts and through serially connected resistors R2 and R3 to a source of negative potential, nominally −12 volts. The emitter of each of transistors Q1 and Q2 is connected to an intermediate reference potential, as ground, and the collector of each of the transistors is connected to the junction between resistors R2 and R3. The resistor R2 connects the collectors of one of the transistors to the base of the other transistor. The bases of each of the transistors is in addition connected to the cathode of a diode D1 whose anode is coupled through capacitor C1 to the output of the voltage controlled oscillator 16.

Interconnecting the bistable devices are resistors R4. Thus, the bases of transistors Q1 and Q2 are respectively connected through different diodes and resistors to the collectors of transistors Q3 and Q4. Similarly, the bases of transistors Q5 and Q6 are connected to the collectors of transistors Q1 and Q2. The feedback from the collector of each transistor to the base of its paired transistor through resistor R2 assures that one transistor in each device will always be saturated while the other transistor will be cut off. The potential at the cathode of each of the diodes D1 will be near ground or slightly negative. On the other hand, the potential on the anode of diodes such as diode D1 connected to the collector of the associated transistors such as the transistor Q3; will vary from approximately ground potential when the transistor Q3 is substantially nonconductive to −11 volts when the transistor Q3 is substantially conductive. Thus one diode such as diode D1 associated with each counter stage will be heavily back biased when the associated transistor, such as Q3, is substantially nonconductive and will be only slightly back biased when the associated transistor Q3 is substantially conductive.

The voltage controlled oscillator or clock 16 through differentiator circuit 17 (not shown in FIGURE 3) and capacitor C1 apply positive clock pulses to the anodes of all of the diodes. These clock pulses will forward bias those diodes which are only slightly back biased. Positive clock pulses coupled to the base of saturated transistors will cut them off but will have no effect when coupled to the base of already cut off transistors. Of course, whenever a transistor is cut off, the other transistor connected thereto becomes saturated.

In operation assume that transistors Q1, Q4 and Q5 are saturated representing the state 100 shown in the aforementioned truth table. As a consequence, the diodes connected to the bases of transistors Q1, Q3 and Q6 will be heavily back biased while the diodes connected to the bases of transistors Q2, Q4 and Q5 will be only slightly back biased. Thus, clock pulses will be coupled to the bases of transistors Q2, Q4 and Q5 but only transistor Q4 will switch inasmuch as it is the only one of these transistors which is in a saturated condition. As a consequence state 110 will be defined. The counter outputs of course can be taken from the collectors of transistors Q1, Q3 and Q5.

Transistor Q7 together with the resistors R5 coupling the collectors of transistors Q2, Q4 and Q6 thereto perform the function attributed to gate 38 and pulse generator 34 of FIGURE 1. That is, if any one of transistors Q2, Q4 and Q6 is cut off so that its collector potential is near −12 volts, the potential on the base of transistor Q7 will be sufficiently negative to hold transistor Q7 off. If on the other hand, transistors Q2, Q4 and Q6 are all saturated, transistor Q7 will conduct thereby lowering the potential on the base of transistor Q5 causing it to conduct thus cutting off transistor Q6.

From the foregoing, it should be apparent that an improved apparatus has been disclosed herein for controlling the speed of a multiphase synchronous motor in response to the level of an analog voltage signal. More broadly, it should be recognized that improved means for splitting a single frequency signal into N phase signals properly displaced from one another has been disclosed.

What is claimed is:

1. Apparatus for controlling the speed of a three phase synchronous motor having three windings, in accordance with a physically varying quantity as represented by the level of an analog voltage signal, said apparatus comprising:

clock means for providing an oscillating signal having a frequency related to said analog voltage signal level;

means for applying said analog voltage signal to said clock means;

differentiator means coupled to the output of said clock means to form positive going pulses in response to selected portions of said oscillating signal;

first, second, and third bistable devices each having an output terminal;

gating means connected to the differentiator means and responsive to each of said positive going pulses for switching in sequence a different one of said bistable devices to cause said bistable devices to provide essentially pure symmetric square wave output signals having harmonics only above the fifth harmonic; and means connected to said bistable devices for directly coupling in single ended relation the square wave output signals provided by each of said bistable devices to a different one of said windings.

2. The apparatus of claim 1 wherein said gating means and said bistable devices comprise a scale of six counters.

3. The apparatus of claim 2 wherein said gating means includes means coupled between said bistable devices and said gating means for preventing all of said bistable devices from simultaneously defining the same state.

4. In combination with a source of a control voltage signal and a multiphase motor having N phase windings, apparatus responsive to said control voltage signal for providing N phase signals displaced from each other by 360°/N for controlling the speed of said motor, said apparatus comprising:

a voltage controlled clock means for supplying a stream of pulses and having an input terminal and an output terminal;

means applying said control voltage signal to said clock means input terminal for causing said clock means to provide an output signal having a frequency rate related to the level of said control voltage signal;

a plurality of bistable devices each having an input terminal and an output terminal, said bistable device output terminals being operatively coupled directly to respective windings of said multi-phase motor to provide a succession of symmetric square wave output signals to the windings; and gating means operatively coupled between the clock means output terminal and the plurality of bistable device input terminals and responsive to each successive pulse of said clock means output signal for sequentially switching a different one of said bistable devices, said gating means including means for preventing all of said bistable devices from simultaneously defining the same state.

5. The apparatus of claim 4 wherein said bistable devices each comprise a pair of transistors having base, emitter and collector electrodes, wherein the collector electrode of a transistor of each bistable device is operatively coupled to a respective winding of said multiphase motor.

6. The apparatus of claim 5 wherein the bases of the transistors are coupled to the voltage controlled clock means via respective diodes.

7. The apparatus of claim 6 wherein the means for preventing all the bistable devices from simultaneously defining the same state comprises an "or" gate coupled between one of the bistable devices and the gating means, an "and" gate connected to a second set of output terminals of said bistable devices, and a trigger pulse generator means connected between the output of the "and" gate and a second input of the "or" gate.

References Cited by the Examiner

UNITED STATES PATENTS

| | | | |
|---|---|---|---|
| 2,953,735 | 9/1960 | Schmidt | 321—5 |
| 3,184,663 | 5/1965 | Mergler | 318—39 |
| 3,218,535 | 11/1965 | Holthaus | 318—138 |

ORIS L. RADER, *Primary Examiner.*

G. FRIEDBERG, G. RUBINSON, *Assistant Examiners.*